(12) United States Patent
Jagannathan et al.

(10) Patent No.: US 10,359,525 B2
(45) Date of Patent: Jul. 23, 2019

(54) METHODS TO IMAGE ACOUSTIC SOURCES IN WELLBORES

(71) Applicant: Halliburton Energy Services, Inc., Houston, TX (US)

(72) Inventors: Srinivasan Jagannathan, Houston, TX (US); Yinghui Lu, The Woodlands, TX (US); Rebecca Jachmann, Spring, TX (US); Nam Nguyen, Singapore (SG); Yi Yang Ang, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 15 days.

(21) Appl. No.: 15/319,974

(22) PCT Filed: Aug. 11, 2016

(86) PCT No.: PCT/US2016/046507
§ 371 (c)(1),
(2) Date: Dec. 19, 2016

(87) PCT Pub. No.: WO2017/044244
PCT Pub. Date: Mar. 16, 2017

(65) Prior Publication Data
US 2017/0269243 A1    Sep. 21, 2017

Related U.S. Application Data

(60) Provisional application No. 62/215,787, filed on Sep. 9, 2015.

(51) Int. Cl.
*G01V 1/28* (2006.01)
*G01V 1/30* (2006.01)
(Continued)

(52) U.S. Cl.
CPC ............ *G01V 1/282* (2013.01); *E21B 47/101* (2013.01); *E21B 47/14* (2013.01); *G01V 1/288* (2013.01);
(Continued)

(58) Field of Classification Search
None
See application file for complete search history.

(56) References Cited

U.S. PATENT DOCUMENTS 3,881,168 A * 4/1975 Farr .................... G01V 1/28
175/50
4,046,220 A   9/1977 Glenn, Jr.
(Continued)

FOREIGN PATENT DOCUMENTS

WO   2016115012 A1   7/2016
WO   2016115030 A1   7/2016

OTHER PUBLICATIONS

ISR/WO for PCT/US2016/046507 dated Nov. 17, 2016.

*Primary Examiner* — Kibrom K Gebresilassie
(74) *Attorney, Agent, or Firm* — Benjamin Fite; C. Tumey Law Group PLLC

(57) ABSTRACT

A method including selecting a forward model based on a modeled well structure and including a single modeled acoustic source located in a modeled wellbore and a plurality of modeled acoustic sensors located in a modeled source area, simulating an acoustic signal generated by the single modeled acoustic source and received by each modeled acoustic sensor, calculating phases of the simulated acoustic signals received at each modeled acoustic sensor, obtaining with a principle of reciprocity a plurality of modeled acoustic sources in the modeled source area and a single modeled acoustic sensor in the modeled wellbore, calculating phase delays of the simulated acoustic signals between each modeled acoustic source and the single modeled acoustic sensor,
(Continued)

detecting acoustic signals generated by a flow of fluid using acoustic sensors in a wellbore, and processing the acoustic signals using the phase delays to generate a flow likelihood map.

20 Claims, 6 Drawing Sheets

(51) Int. Cl.
 *G01V 1/42* (2006.01)
 *G01V 1/50* (2006.01)
 *E21B 47/10* (2012.01)
 *E21B 47/14* (2006.01)
 *G01V 1/40* (2006.01)

(52) U.S. Cl.
 CPC ............ *G01V 1/308* (2013.01); *G01V 1/40* (2013.01); *G01V 1/42* (2013.01); *G01V 1/50* (2013.01); *G01V 2200/16* (2013.01); *G01V 2210/123* (2013.01); *G01V 2210/1234* (2013.01); *G01V 2210/1299* (2013.01); *G01V 2210/1429* (2013.01); *G01V 2210/55* (2013.01); *G01V 2210/614* (2013.01); *G01V 2210/644* (2013.01); *G01V 2210/673* (2013.01)

(56) References Cited

U.S. PATENT DOCUMENTS

| | | | |
|---|---|---|---|
| 4,114,721 A | 9/1978 | Glenn, Jr. | |
| 4,646,273 A | 2/1987 | Carlson et al. | |
| 5,331,604 A * | 7/1994 | Chang | G01V 1/005 367/31 |
| 5,616,840 A * | 4/1997 | Tang | E21B 49/00 367/31 |
| 7,219,762 B2 | 5/2007 | James et al. | |
| 7,464,588 B2 | 12/2008 | Steinsiek | |
| 7,508,734 B2 * | 3/2009 | Fink | G01V 11/002 367/43 |
| 2004/0246866 A1 * | 12/2004 | Sato | G11B 7/00736 369/59.25 |
| 2006/0133203 A1 | 6/2006 | James et al. | |
| 2008/0186805 A1 * | 8/2008 | Han | E21B 47/082 367/35 |
| 2009/0020283 A1 * | 1/2009 | Manin | E21B 47/122 166/147 |
| 2009/0165547 A1 | 7/2009 | Steinsiek | |
| 2010/0262373 A1 * | 10/2010 | Khadhraoui | G01V 1/40 702/16 |
| 2010/0268489 A1 | 10/2010 | Lie et al. | |
| 2011/0096941 A1 * | 4/2011 | Marzetta | G06F 3/013 381/92 |
| 2011/0176386 A1 | 7/2011 | LaPilli et al. | |
| 2011/0188346 A1 * | 8/2011 | Hull | E21B 47/101 367/35 |
| 2012/0068863 A1 * | 3/2012 | Tillotson | G01S 13/003 340/963 |
| 2013/0081804 A1 * | 4/2013 | Sinha | E21B 47/101 166/250.01 |
| 2013/0299165 A1 | 11/2013 | Crow | |
| 2015/0177405 A1 * | 6/2015 | Jannin | G01V 1/48 702/6 |
| 2015/0218929 A1 * | 8/2015 | Narasimhan | E21B 45/00 175/45 |
| 2015/0342567 A1 * | 12/2015 | Ustuner | G10K 11/346 600/447 |
| 2016/0258281 A1 | 9/2016 | Mandal | |
| 2016/0356125 A1 * | 12/2016 | Bello | G06Q 10/04 |
| 2018/0010429 A1 * | 1/2018 | Willberg | E21B 43/26 |
| 2018/0010443 A1 * | 1/2018 | Lu | G01V 1/50 |

* cited by examiner

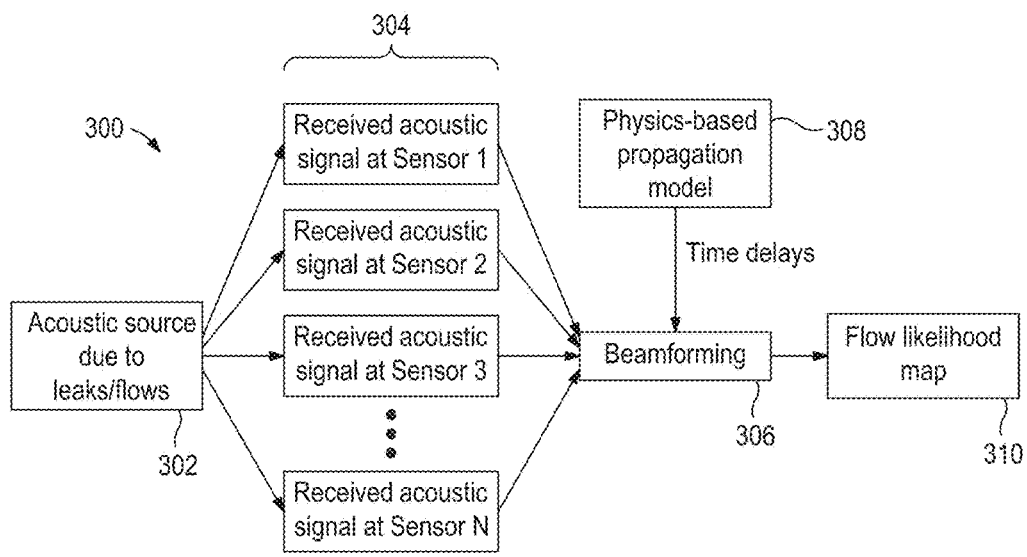
FIG. 3
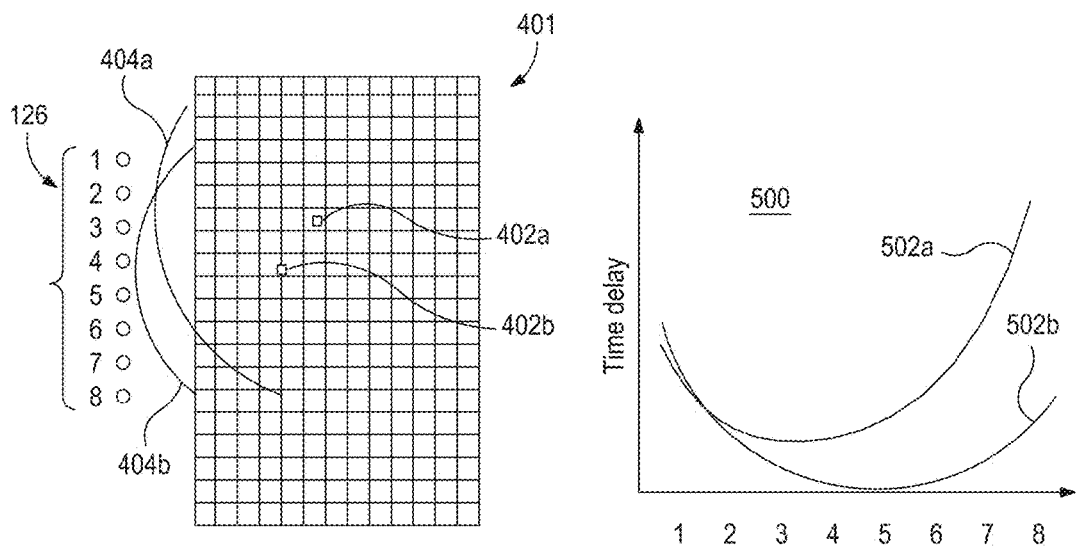
FIG. 4
FIG. 5

METHODS TO IMAGE ACOUSTIC SOURCES IN WELLBORES

CROSS-REFERENCE TO RELATED APPLICATIONS

This application claims priority to U.S. Provisional Patent Application Ser. No. 62/215,787, filed on Sep. 9, 2015.

BACKGROUND

During the life cycle of an oil or gas well, it is desirable to monitor and maintain well integrity. In particular, maintaining the integrity of well barriers, such as production tubing, well casing, and surrounding cement sheaths (if any), is important to ensure safe operation of the well and avoid blow-out incidents or leakage of hydrocarbons to the environment. To obtain a better understanding of the state of a well and make appropriate decisions on repairing or controlling a damaged well, it is desirable to detect the presence, extent, and location (depth) of fluid flowing near or into a wellbore since such information can be utilized in completing wells, performing remedial work, and/or determining one or more characteristics of hydrocarbon reservoirs or the surrounding formation. Monitoring downhole flows around wellbores, such as injected water, can further be of interest in reservoir characterization.

Acoustic sensors carried by downhole tools have traditionally been used to detect fluid flow into wellbores. Fluid entering the wellbore through small areas or flowing behind the wellbore wall creates turbulence and noise, which may be perceived by the acoustic sensors.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 3 is a schematic flow chart of a physics-based propagation model for computing time delays used for beamforming.

FIG. 4 is a schematic diagram of a free-space model depicting two wavefronts of the acoustic signals generated by two acoustic sources.

FIG. 5 is a plot showing the different time-delay profiles as the two wavefronts in FIG. 4 are received across a linear array of acoustic sources.

DETAILED DESCRIPTION

The present disclosure is related to downhole operations and, more particularly, monitoring and characterizing the flow of fluid into a wellbore and imaging the flow.

Embodiments of the present disclosure provide methods of detecting and quantifying the flow of fluid in a wellbore. The presently described methods exploit the acoustic signature of flow to create a map or image that indicates the likelihood of the presence of flow of fluid in the wellbore. The acoustic signals (or waves) emitted by the flow of fluid are detected using an array of acoustic sensors (receivers) in order to locate and characterize leaks (flow) in the wellbore. The multiple acoustic signals are simultaneously recorded by the array of acoustic sensors and are coherently processed in order to detect and image flow of fluids in the wellbore. The acoustic signal processing utilizes a physics-based model that captures phase distortions in the acoustic signals due to the presence of tubing, one or more casings, and other structures in cased-hole or open-hole wellbores. The methods described herein may improve the ability to detect and image leaks and flows in a well.

As used herein, "physics-based model" refers to a mathematical representation of a system or device that takes into account the physical properties or characteristics of the system or device and of any components of the system or device. For instance, a physics-based model of a wellbore is a mathematical representation of the wellbore that includes the physical dimension of the wellbore, the physical properties (e.g., pressure, temperature, porosity, etc.) of the formation penetrated by the wellbore, the physical properties (e.g., thickness, density, etc.) of one or more casings lining the wellbore and any tubing located in the wellbore.

As used herein, "coherent processing" or variations thereof refer to signal processing that considers the phase information of the signals being processed.

As used herein, the term "flow" refers to, among other things, production-flow, formation-flow, channel-flow through cement packs, or leaks in casing or liner that lines a wellbore. Moreover, the term "fluid" refers to a gas, a liquid, a mixture of a gas and a liquid, or suspensions of solids in liquid or gas.

Figure 1:
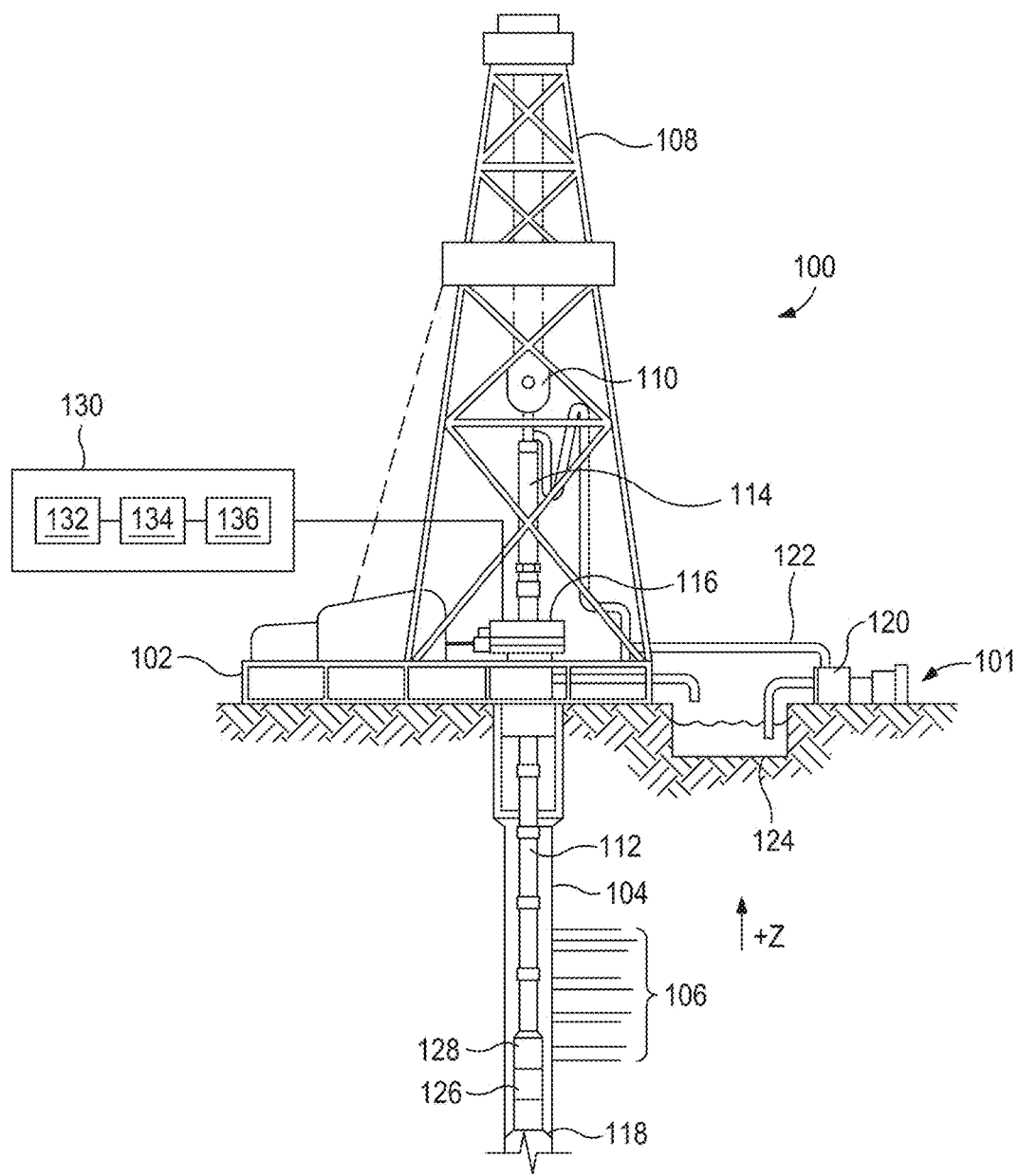
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at a wellsite 101 that includes a wellbore 104 extending from the drilling platform 102 into one or more subterranean formations 106. In other embodiments, such as in an offshore drilling operation, a volume of water may separate the drilling platform 102 and the wellbore 104. In some embodiments, a portion of the wellbore 104 may be lined with one or more strings of casing and cemented in place, as known in the art. The principles and methods of the present disclosure may be employed in portions of the wellbore 104 that are cased, open-hole, or both.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of the surrounding subterranean formations 106. According to the present disclosure, one or both of the MWD and LWD tools may include an array of acoustic sensors 126 used to detect the flow of fluid flowing into and/or adjacent the wellbore 104. In an example, the array of sensors 126 may be a linear array (also referred to as a single dimension array) having multiple sensors 126 arranged at preselected spacing along the longitudinal axis of the tool, and, thus, of the wellbore 104. In another example, the array of sensors 126 may be a multi-dimensional sensor array with the sensors 126 arranged about the longitudinal axis of the tool, and, thus, of the wellbore 104. However, the arrangement of the sensors 126 is not limited thereto and the sensors 126 may be arranged in any configuration as required by the application and design.

The array of acoustic sensors 126 may be communicably coupled to a telemetry module 128 used to transfer measurements and signals from the BHA to a data processing system 130 that processes the acoustic measurements and signals received by the array of acoustic sensors 126 and/or controls the operation of the BHA. In some embodiments, part of the processing may be performed by the telemetry module 128 in combination with the data processing system 130. For example, the telemetry module 128 may pre-process the individual sensor signals (e.g., through signal conditioning, filtering, and/or noise cancellation) and transmit them to the surface data processing system 130 for further processing, where the likelihood map is computed, and any flow-induced acoustic sources are detected and localized based thereon. In at least one embodiment, the data processing system 130 may be configured to provide acoustic logs of the entire length of the wellbore 104 to provide a likelihood map of the flow of fluids in the wellbore 104.

The data processing system 130 may generally be implemented in hardware, software, or a combination thereof, such as with special-purpose circuitry (e.g., a digital signal processor, field-programmable gate-array, etc.) or a suitably programmed general-purpose computer including, e.g., a processor 132 for processing the measurements taken by the array of acoustic sensors 126, a non-transitory computer readable storage medium 134 for storing a computer readable program code executed by the processor, and a display unit 136 for displaying to a user the results of the processing. Examples of a non-transitory computer-readable storage medium include random access memory (RAM) devices, read only memory (ROM) devices, optical devices (e.g., CDs or DVDs), and disk drives. In various embodiments, the processed acoustic signals are evaluated in conjunction with measurements from other sensors (e.g., temperature and surface well pressure measurements) to evaluate flow conditions and overall well integrity. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken by the array of acoustic sensors 126 may also be stored within a memory associated with the acoustic sensors 126 or the telemetry module 128 for later retrieval at the surface upon retracting the drill string 112.

Figure 2:
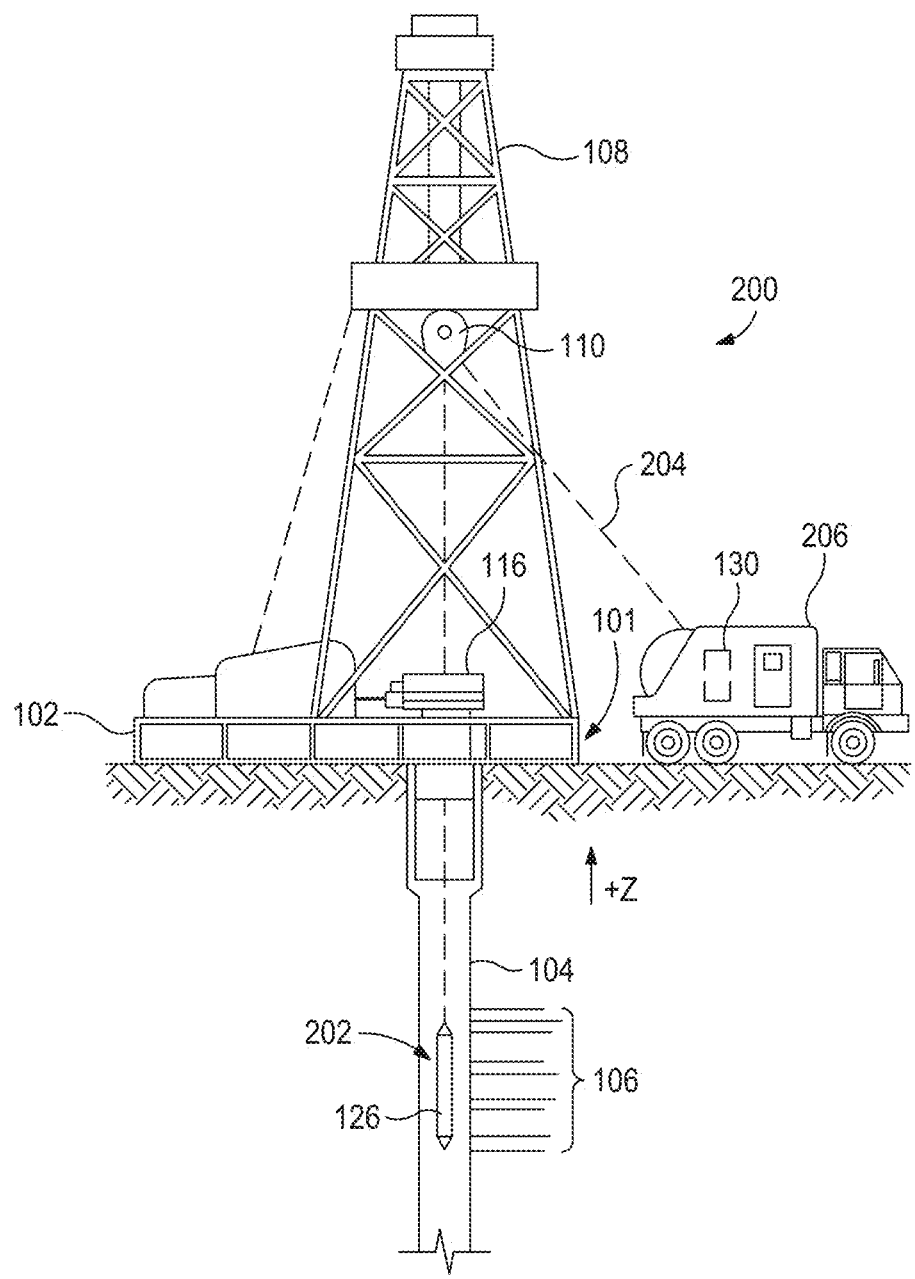
FIG. 2 is a schematic diagram of an exemplary wireline system that may employ the principles of the present disclosure.

At various times during or after the drilling process, as shown in FIG. 2, a wireline system 200 may be introduced into the wellbore 104 to conduct measurement/logging operations. More particularly, FIG. 2 depicts a schematic diagram of an exemplary wireline system 200 that may also employ the principles of the present disclosure, according to one or more embodiments. Like numerals used in FIGS. 1 and 2 refer to the same components or elements and, therefore, will not be described again.

As illustrated, the wireline system 200 may include one or more wireline instrument(s) 202 (one shown) that may be suspended into the wellbore 104 by a cable 204. The wireline instrument(s) 202 may include the array of acoustic sensors 126, which may be communicably coupled to the cable 204. In an example, the array of sensors 126 may be a linear array having multiple sensors 126 arranged at preselected spacing along the longitudinal axis of the wireline instrument(s) 202, and, thus, of the wellbore 104. In another example, the array of sensors 126 may be a multi-dimensional sensor array with the acoustic sensors 126 arranged about the longitudinal axis of the wireline instrument(s) 202, and, thus, of the wellbore 104. However, the arrangement of the acoustic sensors 126 is not limited thereto and the acoustic sensors 126 may be arranged in any configuration as required by the application and design. The cable 204 may include conductors for transporting power to the wireline instrument 202 and also facilitate communication between the surface and the wireline instrument 202. A logging facility 206, shown in FIG. 2 as a truck, may collect measurements from the array of acoustic sensors 126, and may include the data processing system 130 for controlling, processing, storing, and/or visualizing the measurements gathered by the array of acoustic sensors 126. The data processing system 130 may be communicably coupled to the wireline instrument(s) 202 by way of the cable 204.

The acoustic sensors 126 may include electronic sensors, such as hydrophones, piezoelectric sensors, piezoresistive sensors, electromagnetic sensors, accelerometers, or the like. In other embodiments, the acoustic sensors 126 may comprise fiber optic sensors, such as point sensors (e.g., fiber Bragg gratings, etc.) distributed at desired or predetermined locations along the length of an optical fiber. In yet other embodiments, the acoustic sensors 126 may comprise distributed acoustic sensors, which may also use optical fibers and permit a distributed measurement of local acoustics at any given point along the fiber. In still other embodiments, the acoustic sensors 126 may include optical accelerometers or optical hydrophones that have fiber optic cablings.

Additionally or alternatively, in an example (not explicitly illustrated), the acoustic sensors 126 may be attached to or embedded within the one or more strings of casing lining the wellbore 104 and/or the wall of the wellbore 104 at axially spaced pre-determined intervals.

FIG. 3 provides an overview of an example process 300 of creating a fluid flow (leak) likelihood map, according to one or more embodiments. As illustrated, a flow (leak) in the wellbore 104 (FIGS. 1 and 2) generates noise and otherwise provides an acoustic source, as at 302, that exhibits certain temporal and spectral characteristics. In the time domain, for example, the flow-generated noise is assumed to be continuous and stationary over a certain time scale. In the frequency domain, the spectrum of the noise is assumed to be broadband. In general, the characteristics of the acoustic source may vary depending on various factors including, but not limited to, (1) the type of flow (i.e. turbulent/laminar), (2) the dimensions of the orifice/channel where the flow is occurring, (3) the phase of the fluid, and (4) the flow rate of the flow.

The sound generated by the flow, as at 302, may be detected (perceived) by multiple acoustic sensors 126 (FIGS. 1 and 2) at varying axial positions along the wellbore 104, as at 304. As indicated above, the acoustic sensors 126 may be arranged and otherwise positioned in an array along the longitudinal axis of the wellbore 104. Each acoustic sensor 126 is designed such that it is sensitive to the typical frequency range of leak-generated noise. In some cases, this frequency range may vary between 500 Hz to 50 kHz.

The output of each acoustic sensor 126 is then processed using desired signal processing techniques. In an example, and as illustrated, the output of each acoustic sensor 126 may be processed using beamforming, as at 306. Beamforming is a signal processing technique of determining the location of a source (e.g., an acoustic source, in this case) using multiple measurements from multiple receivers (i.e., the acoustic sensors 126) at unique (known) spatial locations. The beamforming process exploits the phase relationship of the signals received at the receiver locations to determine a specific source location. In free-space, for example, the signal from a point source spreads spherically as it propagates outward. The wavefront (or locus of points with the same phase) is circular. This leads to a circular time delay profile for the signals as they are received by an array of receivers (i.e., the acoustic sensors) some distance away from the point source. Different point source locations lead to different delay profiles at the receiver array. This knowledge of free-space propagation may then be used to determine the location of the source in free-space, as explained below with reference to FIGS. 4 and 5.

The signal processing technique (beamforming, in this case) generally relies on a forward model of wave propagation from the acoustic source(s) to the acoustic sensors to solve the inverse problem (e.g., source localization). In applications, such as radar and sonar, this forward model is a free space model that assumes wave propagation in a uniform (homogenous and isotropic) medium (e.g., air or water) and assumes the source to be far away from the sensors. However, when the flow of fluid in and surrounding a wellbore is to be measured, the free space model will produce erroneous results.

Accordingly, in one or more embodiments disclosed, a forward model of wave propagation is used during beamforming. For example, the forward model may be based on a modeled well structure (e.g., a mathematical representation of a known well structure) that includes the configuration and conditions of the wellbore and surrounding formation, and the various propagation media and boundaries therebetween. The wellbore and formation configuration may include the diameter of the wellbore, the material of the casing lining the wellbore, the density of casing material, the thickness of casing, the composition of the formation, the formation geology and lithology, the presence of faults or fractures in the formation, and the like. The wellbore and formation conditions include the temperature of the formation and in the wellbore, the pressure in the wellbore and of the formation, the humidity in the wellbore, formation porosity, formation density, formation electrical conductivity, formation electrical resistivity, formation hardness, and the like. The forward model also accounts for the effect of the well structure on the acoustic signal (or wave) refractions, reflections, resonances, etc., as the acoustic signals propagate through the well structure. It should be noted that the forward model can be expanded to include various other wellbore and formation parameters, without departing from the scope of the disclosure By accounting for the effects of the wellbore and the formation on the acoustic signals, the forward model facilitates the processing of near-field signals (i.e., signals originating from a source whose distance from the acoustic sensors is not significantly (e.g., orders of magnitude) larger than the spatial extent of the sensor array). Because the forward model is specific to a given wellbore and formation configuration and condition, different forward models are required for different wellbore and formation configurations and conditions. Thus, during measurement, as the logging tool including the acoustic sensors 126 is drawn uphole, for every axial location in the wellbore where the wellbore and formation configuration and/or condition change, a different forward model corresponding to the wellbore and formation configuration and/or condition at that location may be selected. The forward model may be selected from a collection of forward models stored in the computer readable storage medium 134 (FIGS. 1 and 2) of the data processing system 130 (FIGS. 1 and 2).

A physics-based propagation model may be used during beamforming, as at 308, and will be described below with reference to FIG. 8. At the end of the process, a fluid flow (leak) likelihood map may be generated based on the results of the beamforming process, as at 310.

FIG. 4 is a schematic diagram illustrating the propagation of acoustic signals in free-space. As illustrated, the eight acoustic sensors 126 (FIGS. 1 and 2) are depicted aligned in a linear array (numbered 1 thru 8). However, as mentioned above, the placement of the acoustic sensors 126 is not limited to a linear array and the acoustic sensors 126 can be placed in any desired configuration depending on the application. A source area 401 may be defined adjacent the acoustic sensors 126 and may generally include one or more sources of leaks/flows that generate an acoustic signal. The dimensions (e.g., the radial and/or axial extent) of the source area 401 may be such that a wavefront of an acoustic signal generated by an acoustic source placed at any location in the source area 401 is circular (or spherical) when received by the acoustic sensors 126. In FIG. 4, the source area 401 is illustrated spatially separated from the acoustic sensors 126. However, in other examples, the acoustic sensors 126 may be positioned in the source area 401 or may at least partially overlap the source area 401.

A first acoustic source 402a is located at a first location in the source area 401 away from the acoustic sensors 126, and a second acoustic source 402b is located at a second location in the source area 401 away from the acoustic sensors 126. The first acoustic source 402a may generate a first wavefront 404a, and the second acoustic source 402b may generate a second wavefront 404b. In free-space, each wavefront 404a,b propagates unhindered toward the linear array of acoustic sensors 126 as a spherically-spreading waveform (illustrated as circular waves) emanating from the first and second acoustic sources 402a,b, respectively. As a result, there will be a circular time delay profile for the noise signals as they are received by the acoustic sensors 126.

FIG. 5 is a plot 500 showing the different time-delay profiles as the first and second wavefronts 404a,b are received across the linear array of acoustic sensors 126 in FIG. 4. More particularly, the plot 500 depicts a first delay curve 502a corresponding to the first wavefront 404a and a second delay curve 502b corresponding to the second wavefront 404b. As illustrated, each delay curve 502a,b exhibits a generally circular profile for the noise signals as they are received by the acoustic sensors 126.

The delay curves 502a,b are determined by the phase difference (also referred to as the time delay) between the first and second wavefronts 404a,b measured by the acoustic sensors 126 as the wavefronts 404a,b propagate from the acoustic sources 402a,b to the acoustic sensors 126. However, as mentioned above, the free-space scenario in FIG. 4 is not applicable to wellbores that are cased or open-hole.

Figure 6:
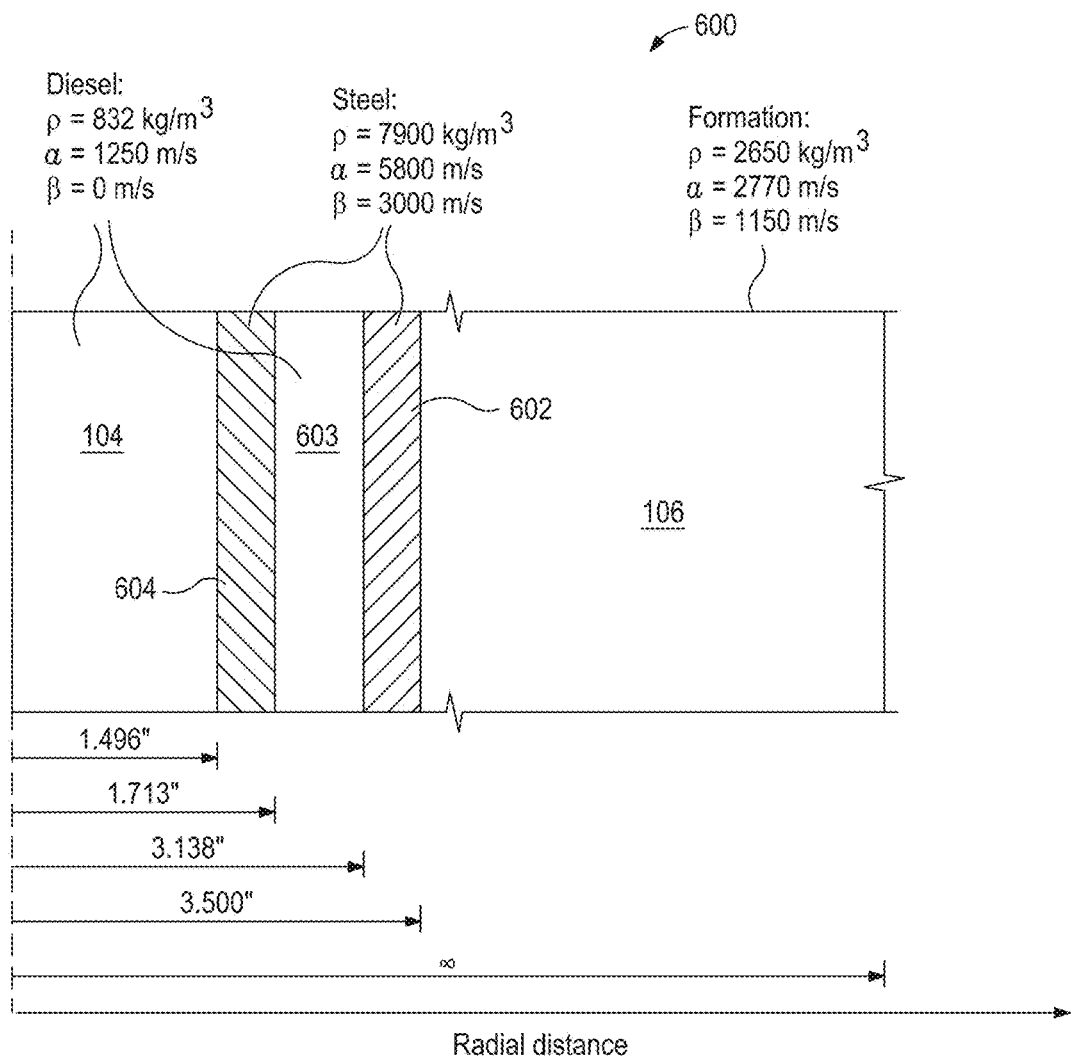
FIG. 6 depicts a schematic view of a portion of the wellbore of FIGS. 1 and 2 used to simulate phase computation.

FIG. 6 illustrates a schematic example of a cased-hole setup 600 for simulating the phase differences between two or more wavefronts due to a cased wellbore and its surrounding layers (pipe, casing, cement sheath, formation layers, etc.). As illustrated, the setup 600 may include the wellbore 104 lined with casing 602 secured adjacent one or more layers (one shown) of the surrounding subterranean formation 106. A tubing 604, such as drill pipe, production tubing, coiled tubing, etc. may be extended within the wellbore 104 and concentrically located within the casing 602. An annulus 603 may be defined between the casing 602 and the tubing 604.

The casing 602 and the tubing 604 may each be assumed to be made of steel, as noted in FIG. 6, having various known properties, such as density ($\rho$), compression speed ($\alpha$) of sound in the casing 602 and the tubing 604, and shear speed ($\beta$) of sound in the casing 602 and the tubing 604. Moreover, for simulation purposes, it is assumed that the wellbore 104 and the annulus 603 may be filled with a hydrocarbon, such as diesel, which also exhibits various known properties of density ($\rho$), compression speed ($\alpha$) of sound in diesel, and shear speed ($\beta$) of sound in diesel. The simulation may also consider the various known properties of the formation, such as density ($\rho$), compression speed ($\alpha$) of sound in the formation 106, and shear speed ($\beta$) of sound in the formation 106. It should, however, be noted that additional properties of the formation 106, the casing 602, the tubing 604, and diesel can also be considered in the simulation, without departing from the scope of the disclosure. For example, the additional properties may include temperature, viscosity, bulk modulus, real gas constants, etc.

It will be understood that, in case of open-hole wellbores, a simulation for phase computation may be run using an open-hole setup. For example, the open-hole setup may be similar to the cased-hole setup illustrated in FIG. 6, except that the casing 602 is absent and, thus, the annulus 603 is defined between the tubing 604 and the formation 106. However, other open-hole setups based on the structure of the wellbore and its surrounding layers may be used, without departing from the scope of the disclosure.

Figure 7A:
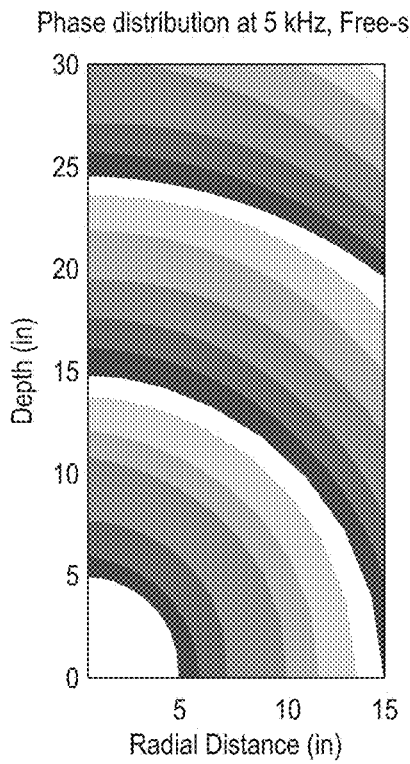
FIGS. 7A and 7B depict a comparison of free-space scenario phase distribution and phase distribution in the presence of casing and tubing of FIG. 6.
Figure 7B:
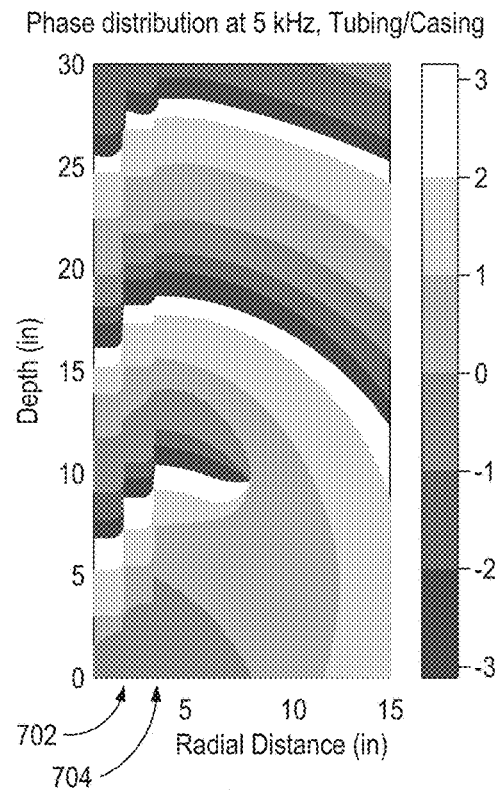

FIGS. 7A and 7B depict a comparison between phase distribution of acoustic waves propagating in free-space and phase distribution of acoustic waves propagating in the cased-hole setup 600 FIG. 6. The acoustic waves are assumed to have a frequency of around 5 kHz and the wavefronts thereof propagate radially outward from an acoustic source located at the origin (0,0) in FIGS. 7A and 7B. It should be noted that the phase is measured between $-\pi$ and $+\pi$, as shown in the shaded scale to the right of each FIGS. 7A and 7B.

In FIG. 7B, the two vertical lines of discontinuity 702, 704 in the phase indicate the spatial location of the casing 602 and the tubing 604, respectively. As can be seen, the presence of the casing 602 and the tubing 604 substantially distorts the wavefronts and, therefore, correspondingly distorts the phase of the acoustic signal received. It is seen that the wavefronts become spherical once outside the casing 602. This indicates that outside of the casing 602, the beamforming technique may assume that the wavefronts are generated from a source located in free space. From the distortion of the wavefronts inside the casing 602 and the tubing 604, it will be understood that a free space model cannot be used for the beamforming technique.

Figure 8:
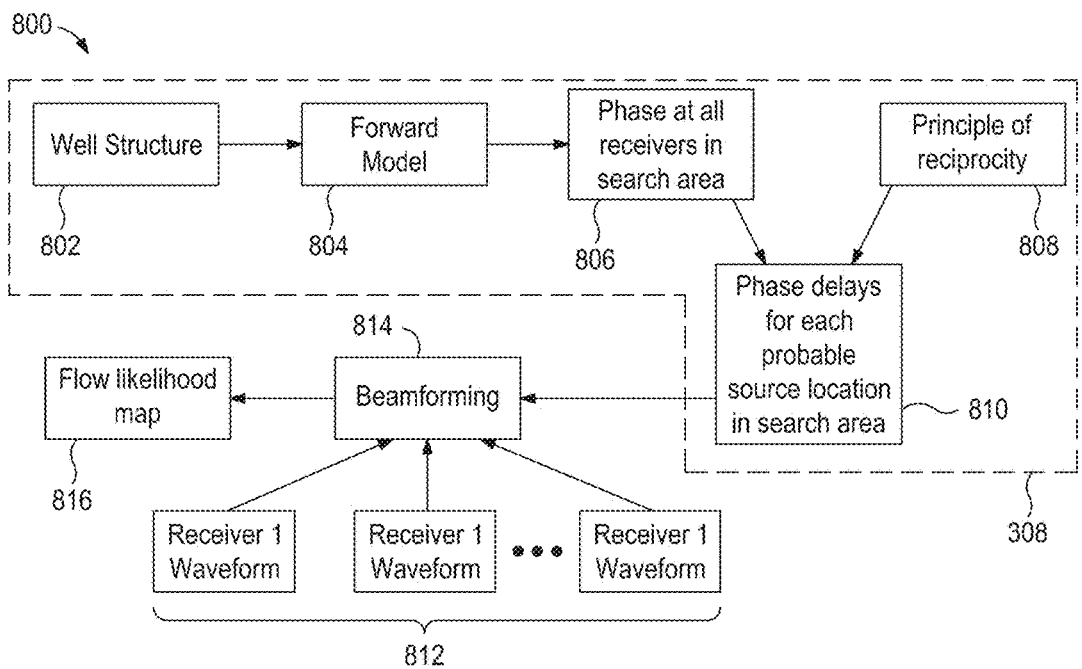
FIG. 8 is a flowchart of a method for implementing a model-based beamforming algorithm.

FIG. 8 is a flowchart of a method 800 for generating a flow likelihood map using a model-based beamforming algorithm, according to one or more embodiments. The method may include applying the physics-based propagation model, as at 308 of FIG. 3 above, to the beamforming algorithm. According to the method, a modeled well system or structure having a known geometry and known properties is obtained, as at 802. The modeled well structure may be similar to the cased-hole setup 600 shown in FIG. 6, for example. However, other cased-hole setups or open-hole setups may also be used.

The modeled well structure is then provided to an example forward model of wave propagation to model the relative phase distribution of the acoustic signals, as at 804. Existing forward models of wave propagation used in beamforming algorithms consider propagation of acoustic signals in free-space, as illustrated in FIG. 4, and assume multiple acoustic sources placed in a source area (e.g., the source area 401 in FIG. 4). The forward models then determine the phase of the acoustic signals received at each acoustic sensor in the acoustic sensors placed in the wellbore. Such an arrangement requires a simulation to be run for each acoustic source in the source area, and requires a significantly large amount of computing power, resources, and time.

On the contrary, the example forward model of wave propagation assumes that multiple modeled acoustic sensors are placed in a modeled source area of the modeled well structure and a single modeled acoustic source is placed in the modeled wellbore of the modeled well structure. In some embodiments, the modeled acoustic sensors may be densely packed in region(s) of the modeled source area where monitoring for a leak/flow is of relatively greater interest and/or in region(s) where the probability of a presence of a leak is relatively higher. Additionally or alternatively, the modeled acoustic sensors may be sparsely packed in region(s) of the modeled source area where monitoring for a leak/flow is of relatively lesser interest and/or in region(s) where the probability of a presence of a leak is relatively lower. For example, monitoring a leak/flow near the wellbore is of greater interest compared to monitoring a leak/flow away from the wellbore. Thus, the modeled acoustic sensors may be densely packed in one or more region near the wellbore and may be sparsely packed in one or more regions away from the wellbore.

As used herein, the term "densely packed" or variations thereof refers to crowded closely together. As used herein, the term "sparsely packed" or variations thereof refers to scattered or uncrowded. For instance, modeled acoustic sensors that are densely packed may be located at intervals of around $\frac{1}{10}^{th}$ of an inch and modeled acoustic sensors that are sparsely packed may be located at intervals of around 1 inch. Stated otherwise, a number of modeled acoustic sensors per unit area in a region of the modeled source area having densely packed modeled acoustic sensors is higher than a number of modeled acoustic sensors per unit area in a region of the modeled source area having sparsely packed modeled acoustic sensors.

The modeled source area may be or include the cased-hole setup 600 (FIG. 6) or at least a portion thereof. Thus, the modeled source area may include one or more of the modeled wellbore, string(s) of casing lining the modeled wellbore, any tubing (drill pipe, production tubing, coiled tubing, etc.) in the modeled wellbore, the cement (or other bonding material) securing the casing string(s) to the modeled wellbore or to each other (in case of multiple casing strings), fluids in the modeled wellbore, and the surrounding formation.

The example forward model simulates an acoustic signal generated by the single modeled acoustic source located in the modeled wellbore and received by each modeled acoustic sensor of the multiple modeled acoustic sensors in the modeled source area. The forward model then calculates the phase of the simulated acoustic signal, as at 806. Specifically, the forward model calculates the phase of the simulated acoustic signal as expected at each modeled acoustic sensor in the modeled source area while taking into consideration the modeled well structure obtained at 802 and the distortions (e.g., phase changes) in the simulated acoustic signal due to the modeled well structure.

According to a principle of reciprocity, the acoustic signal (or wave) received by a sensor at a location B due to a source at a location A is the same as the acoustic signal (or wave) received by a sensor at location A due to a source at location B, subject to a scale change proportional to an impedance of the medium through which the acoustic signal (or wave) propagates. Stated otherwise, the locations of the acoustic source and acoustic sensor are interchangeable. The scale change does not affect the phase of the acoustic signal received by the sensor. Thus, by way of the principle of reciprocity, the modeled source area of the modeled well structure includes multiple modeled acoustic sources and the modeled wellbore of the modeled well structure includes a single modeled acoustic sensor.

At 808, the method 800 applies the principle of reciprocity to the phase calculations performed at 806, and phase delays in the simulated acoustic signal between each modeled acoustic source of the multiple modeled acoustic sources in the modeled source area and a modeled acoustic sensor located in the modeled wellbore are calculated, as at 810. Specifically, the phase delays are indicative of the phase delays observed in the simulated acoustic signal when detected by the single modeled acoustic sensor in the modeled wellbore. The phase delays may be calculated using a forward model different from the forward model used for phase calculations at 804 and can be constructed using custom code, numerical FEM packages such as COMSOL, ANSYS or packages such as Wavenology that use numerical simulation algorithms like Finite Difference (FD), Finite Element (FE) and Spectral Element (SE). Because of the principle of reciprocity, the number of simulations required for phase calculations is substantially reduced, thereby reducing the computing power, resources, and time required. In contrast, existing methods for generating a flow likelihood map do not use the principle of reciprocity, and, as a result, phase calculations have to be performed for determining phase delays in acoustic signals from multiple acoustic sources.

With continued reference to FIG. 8, acoustic signals generated by a flow of a fluid are obtained using a plurality of sensors (e.g., a linear array of acoustic sensors 126) positioned in the wellbore (e.g., the wellbore 104 in FIGS. 1 and 2), as at 812. The acoustic signals may be generated from unknown acoustic sources (i.e., a leaks or flows) in the wellbore and/or the surrounding formation (e.g., formation 106 in FIGS. 1 and 2). Once the acoustic signals are recorded by the acoustic sensors (e.g., for a specific time period), they are then processed using a beamforming algorithm, as at 814. The beamforming algorithm is also provided with the phase delays calculated at 810, and thereby obtaining the time delay of an acoustic signal from an acoustic source to each acoustic sensor of the plurality of acoustic sensors.

In an example implementation of the beamforming algorithm, the signals from the receivers are appropriately delayed using the calculated phase delays and summed to obtain the value of the acoustic energy at the location of the acoustic source. This process is repeated for all possible time delay values from all possible acoustic source locations and the flow likelihood map may be generated, as at 816. The flow likelihood map illustrates the acoustic energy distribution in the modeled source area. In the flow likelihood map, higher the acoustic energy at a location, greater is the probability of a flow at that location. From the flow likelihood map and a priori information about the pressure difference, the direction of the flow can also be determined. For example, the flow likelihood map may indicate acoustic activity at a certain casing-wellbore interface implying a flow (or leak) at that location. However, if the pressure difference between the annuli surrounding the flow is known, the flow direction can be determined. Thus, remedial operations may then be performed to contain the flow.

Figure 9:
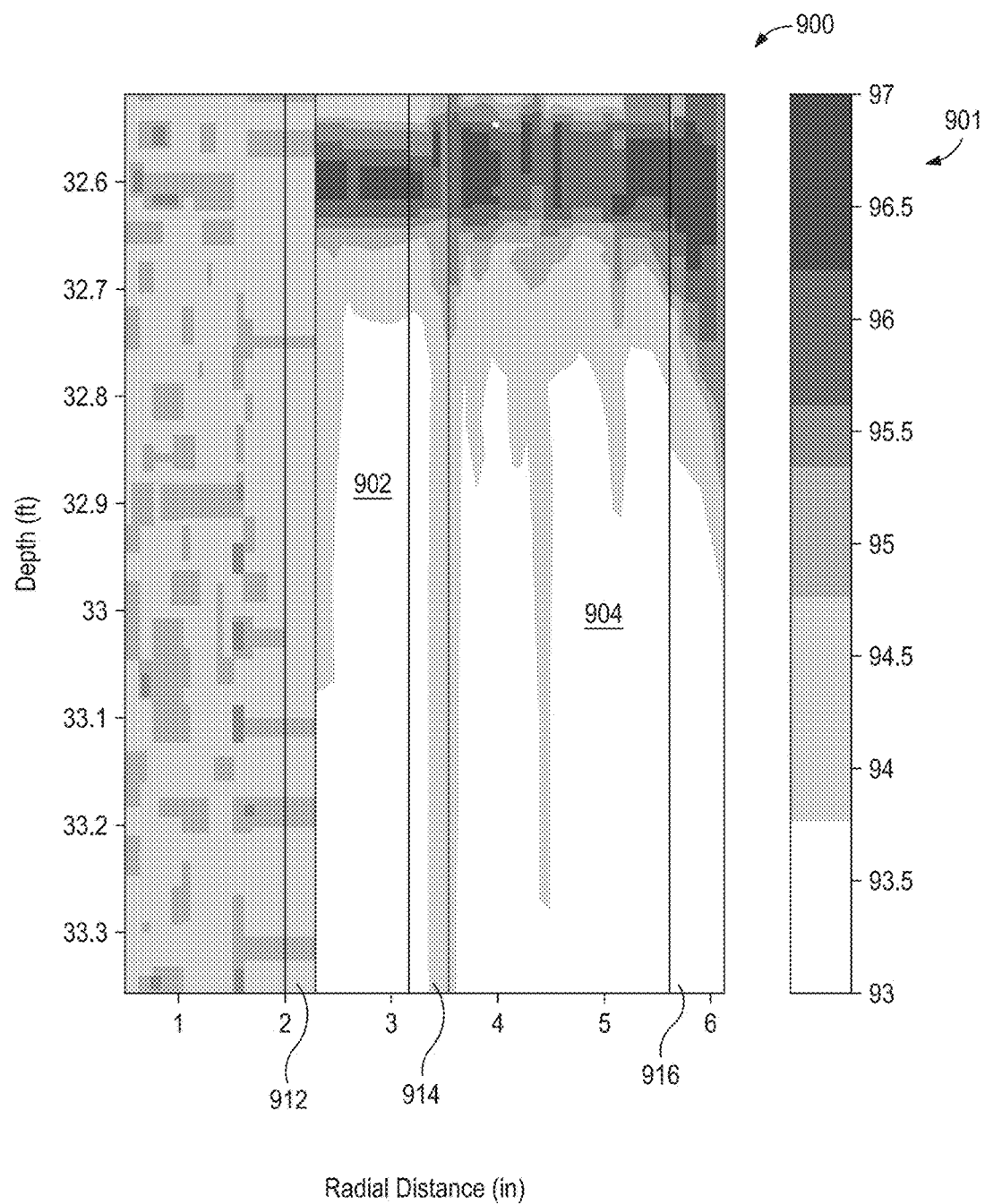
FIG. 9 illustrates an example flow likelihood map obtained using the example method disclosed herein.

FIG. 9 illustrates an example flow likelihood map 900 that may be obtained using the example method described above. In the map 900, the radial distance from the longitudinal axis of the wellbore (or the longitudinal axis of the measuring tool) is represented on the abscissa and the wellbore depth is represented on the ordinate. The map 900 may also depict annuli 902 and 904 defined between corresponding concentric casing strings 912, 914, and 916. The shaded scale 901 to the right of the map 900 indicates the likelihood (or probability) of a flow. As illustrated, the map 900 indicates a flow from the annulus 902 to the annulus 904 around 32 ft. from the surface.

Embodiments disclosed herein include:

A. A method that includes selecting a forward model based on a modeled well structure and including a single modeled acoustic source located in a modeled wellbore of the modeled well structure and further including a plurality of modeled acoustic sensors located in a modeled source area of the modeled well structure; simulating with the forward model an acoustic signal generated by the single modeled acoustic source and received by each modeled acoustic sensor of the plurality of modeled acoustic sensors; calculating with the forward model phases of the simulated acoustic signals received at each modeled acoustic sensor; obtaining with a principle of reciprocity a plurality of modeled acoustic sources in the modeled source area and a single modeled acoustic sensor in the modeled wellbore; calculating phase delays of the simulated acoustic signals between each modeled acoustic source and the single modeled acoustic sensor; detecting acoustic signals generated by a flow of fluid using a plurality of acoustic sensors positioned in a wellbore; and processing the acoustic signals using the phase delays and thereby generating a flow likelihood map to determine a location of the flow of the fluid.

B. A system that includes a plurality of acoustic sensors positioned in a wellbore to detect acoustic signals generated by a flow of fluid; and a data processing system communicably coupled to the plurality of acoustic sensors and including a processor and a non-transitory computer readable storage medium storing a computer readable program code that when executed by the processor causes the data processing system to: select a forward model based on a modeled well structure and including a single modeled acoustic source located in a modeled wellbore of the modeled well structure and further including a plurality of modeled acoustic sensors located in a modeled source area of the modeled well structure, simulate with the forward model an acoustic signal generated by the single modeled acoustic source and received by each modeled acoustic sensor of the plurality of modeled acoustic sensors, calculate with the forward model phases of the simulated acoustic signals received at each modeled acoustic sensor, obtain with a principle of reciprocity a plurality of modeled acoustic sources in the modeled source area and a single modeled acoustic sensor in the modeled wellbore, calculate phase delays of the simulated acoustic signals between each modeled acoustic source and the single modeled acoustic sensor, actuate the plurality of acoustic sensors to detect the acoustic signals, and process the acoustic signals using the phase delays and thereby generate a flow likelihood map to determine a location of the flow of the fluid.

Each of embodiments A and B may have one or more of the following additional elements in any combination: Element 1: wherein the modeled wellbore of the modeled well structure is modeled as one of an open-hole wellbore and a cased wellbore. Element 2: wherein the plurality of acoustic sensors are included in a linear array of acoustic sensors, the method further comprising positioning the linear array of acoustic sensors along a longitudinal axis of the wellbore. Element 3: wherein the modeled source area includes a first region having a higher probability of a presence of the flow of the fluid as compared to a second region, and the plurality of modeled acoustic sensors are more densely packed in the first region as compared to the second region. Element 4: wherein processing the acoustic signals comprises beamforming. Element 5: wherein selecting the forward model comprises selecting the forward model from a collection of forward models. Element 6: wherein selecting the forward model comprises selecting the forward model based at least in part on a configuration or a condition of the wellbore. Element 7: wherein detecting the acoustic signals generated by the flow of the fluid comprises detecting the acoustic signals generated by at least one of the flow of the fluid in the wellbore, the flow of the fluid located in one or more subterranean formations penetrated by the wellbore, and the flow of the fluid in an annulus defined between one or more strings of casing lining the wellbore and the one or more subterranean formations penetrated by the wellbore. Element 8: further comprising generating the flow likelihood map to indicate a distribution of acoustic energy in the modeled source area. Element 9: further comprising determining a direction of the flow of the fluid based on the flow likelihood map.

Element 10: wherein the wellbore of the modeled well structure is modeled as one of an open-hole wellbore and a cased wellbore. Element 11: wherein the plurality of acoustic sensors are included in a linear array of acoustic sensors that is disposed along a longitudinal axis of the wellbore. Element 12: wherein the modeled source area includes a first region having a higher probability of a presence of a flow as compared to a second region, and the plurality of modeled acoustic sensors are more densely packed in the first region as compared to the second region. Element 13: wherein executing the program code further causes the data processing system to process the acoustic signals using beamforming. Element 14: wherein executing the program code further causes the data processing system to select the forward model from a collection of forward models. Element 15: wherein executing the program code further causes the data processing system to select the forward model based at least in part on a configuration or a condition of the wellbore. Element 16: wherein executing the program code further causes the data processing system to actuate the plurality of acoustic sensors to detect the acoustic signals generated by at least one of the flow of the fluid in the wellbore, the flow of the fluid located in the one or more subterranean formations penetrated by the wellbore, and the flow of the fluid in an annulus defined between one or more strings of casing lining the wellbore and the one or more subterranean formations penetrated by the wellbore. Element 17: wherein executing the program code further causes the data processing system to generate the flow likelihood map to indicate a distribution of acoustic energy in the modeled source area. Element 18: wherein executing the program code further causes the data processing system to determine a direction of the flow of the fluid based on the flow likelihood map.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
selecting a forward model based on a modeled well structure and including a single modeled acoustic source located in a modeled wellbore of the modeled well structure and further including a plurality of modeled acoustic sensors located in a modeled source area of the modeled well structure;
simulating, using the forward model, an acoustic signal generated by the single modeled acoustic source and received by each modeled acoustic sensor of the plurality of modeled acoustic sensors and thereby obtaining simulated acoustic signals;
calculating, using the forward model, phases of the simulated acoustic signals received at each modeled acoustic sensor;
obtaining, using a principle of reciprocity, a plurality of modeled acoustic sources in the modeled source area and a single modeled acoustic sensor in the modeled wellbore;
calculating phase delays of the simulated acoustic signals between each modeled acoustic source and the single modeled acoustic sensor obtained using the principle of reciprocity;
detecting acoustic signals generated by a flow of fluid using a plurality of acoustic sensors positioned in a wellbore;
processing the detected acoustic signals using the phase delays and thereby generating a flow likelihood map; and
determining, using the flow likelihood map, a location of the flow of the fluid in a subterranean formation surrounding the wellbore.

2. The method of claim 1, wherein the modeled wellbore of the modeled well structure is modeled as one of an open-hole wellbore and a cased wellbore.

3. The method of claim 1, wherein the plurality of acoustic sensors are included in a linear array of acoustic sensors, the method further comprising positioning the linear array of acoustic sensors along a longitudinal axis of the wellbore.

4. The method of claim 1, wherein the modeled source area includes a first region having a higher probability of a presence of the flow of the fluid as compared to a second region, and the plurality of modeled acoustic sensors are more densely packed in the first region as compared to the second region.

5. The method of claim 1, wherein processing the detected acoustic signals comprises beamforming.

6. The method of claim 1, wherein selecting the forward model comprises selecting the forward model from a collection of forward models.

7. The method of claim 1, wherein selecting the forward model comprises selecting the forward model based at least in part on a configuration or a condition of the wellbore.

8. The method of claim 1, wherein detecting the acoustic signals generated by the flow of the fluid comprises detecting the acoustic signals generated by at least one of the flow of the fluid in the wellbore, the flow of the fluid located in one or more subterranean formations penetrated by the wellbore, and the flow of the fluid in an annulus defined between one or more strings of casing lining the wellbore and the one or more subterranean formations penetrated by the wellbore.

9. The method of claim 1, further comprising generating the flow likelihood map to indicate a distribution of acoustic energy in the modeled source area.

10. The method of claim 1, further comprising determining a direction of the flow of the fluid based on the flow likelihood map.

11. A system, comprising:
a plurality of acoustic sensors positioned in a wellbore to detect acoustic signals generated by a flow of fluid; and
a data processing system communicably coupled to the plurality of acoustic sensors and including a processor and a non-transitory computer readable storage medium storing a computer readable program code that when executed by the processor causes the data processing system to:
select a forward model based on a modeled well structure and including a single modeled acoustic source located in a modeled wellbore of the modeled well structure and further including a plurality of modeled acoustic sensors located in a modeled source area of the modeled well structure,
simulate, using the forward model, an acoustic signal generated by the single modeled acoustic source and received by each modeled acoustic sensor of the plurality of modeled acoustic sensors and thereby obtain simulated acoustic signals,
calculate, using the forward model, phases of the simulated acoustic signals received at each modeled acoustic sensor,
obtain, using a principle of reciprocity, a plurality of modeled acoustic sources in the modeled source area and a single modeled acoustic sensor in the modeled wellbore,
calculate phase delays of the simulated acoustic signals between each modeled acoustic source and the single modeled acoustic sensor,
actuate the plurality of acoustic sensors to detect the acoustic signals,
process the detected acoustic signals using the phase delays and thereby generate a flow likelihood map, and
determine, using the flow likelihood map, a location of the flow of the fluid in a subterranean formation surrounding the wellbore.

12. The system of claim 11, wherein the wellbore of the modeled well structure is modeled as one of an open-hole wellbore and a cased wellbore.

13. The system of claim 11, wherein the plurality of acoustic sensors are included in a linear array of acoustic sensors that is disposed along a longitudinal axis of the wellbore.

14. The system of claim 11, wherein the modeled source area includes a first region having a higher probability of a presence of a flow as compared to a second region, and the plurality of modeled acoustic sensors are more densely packed in the first region as compared to the second region.

15. The system of claim 11, wherein executing the program code further causes the data processing system to process the detected acoustic signals using beamforming.

16. The system of claim 11, wherein executing the program code further causes the data processing system to select the forward model from a collection of forward models.

17. The system of claim 11, wherein executing the program code further causes the data processing system to select the forward model based at least in part on a configuration or a condition of the wellbore.

18. The system of claim 11, wherein executing the program code further causes the data processing system to actuate the plurality of acoustic sensors to detect the acoustic signals generated by at least one of the flow of the fluid in the wellbore, the flow of the fluid located in one or more subterranean formations penetrated by the wellbore, and the flow of the fluid in an annulus defined between one or more strings of casing lining the wellbore and the one or more subterranean formations penetrated by the wellbore.

19. The system of claim 11, wherein executing the program code further causes the data processing system to generate the flow likelihood map to indicate a distribution of acoustic energy in the modeled source area.

20. The system of claim 11, wherein executing the program code further causes the data processing system to determine a direction of the flow of the fluid based on the flow likelihood map.

\* \* \* \* \*